J. R. SCHWARZ.
VELOCIPEDE FOR CHILDREN.
APPLICATION FILED SEPT. 25, 1920.

1,386,736.

Patented Aug. 9, 1921.
2 SHEETS—SHEET 1.

INVENTOR
John R. Schwarz.
BY
George W. Hinton.
ATTORNEY

J. R. SCHWARZ.
VELOCIPEDE FOR CHILDREN.
APPLICATION FILED SEPT. 25, 1920.
1,386,736.
Patented Aug. 9, 1921.
2 SHEETS—SHEET 2.
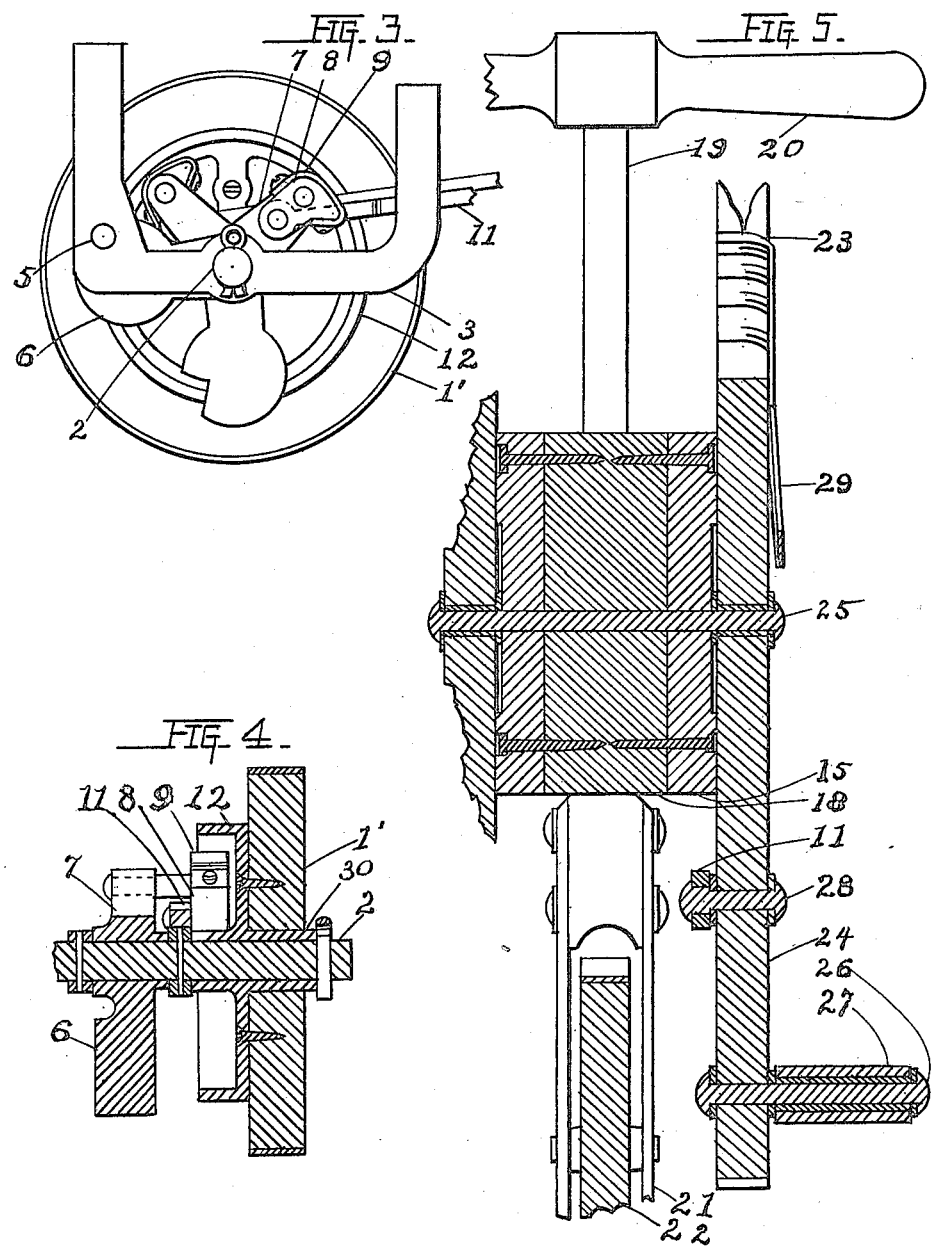

UNITED STATES PATENT OFFICE.

JOHN R. SCHWARZ, OF ST. JOSEPH, MISSOURI.

VELOCIPEDE FOR CHILDREN.

1,386,736.　　　　　　　Specification of Letters Patent.　　Patented Aug. 9, 1921.

Application filed September 25, 1920. Serial No. 412,684.

*To all whom it may concern:*

Be it known that I, JOHN R. SCHWARZ, a citizen of the United States, residing at St. Joseph, in the county of Buchanan and State of Missouri, have invented certain new and useful Improvements in Velocipedes for Children, of which the following is a specification, reference being had therein to the accompanying drawing.

My invention relates to improvements in that class of velocipedes, which are used by children while at play; and the objects of my improvements are, first; to provide a simple, substantial and durable vehicle of this class, which can easily and quickly be started and stopped by the use of one pair of pedals, second; to so construct a velocipede that two children may at one time, ride thereon, third; to so form and arrange the parts of a velocipede, that they shall be neat, attractive and pleasing in appearance, be interesting in their movements and be cheap in cost of manufacture.

Figure 1:
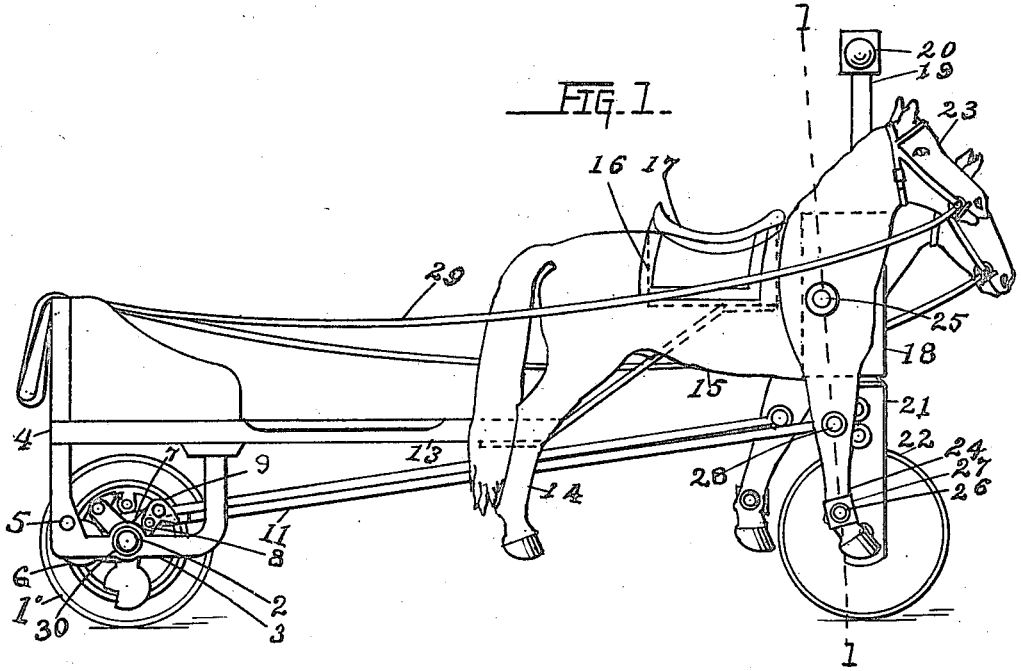
Figure 2:
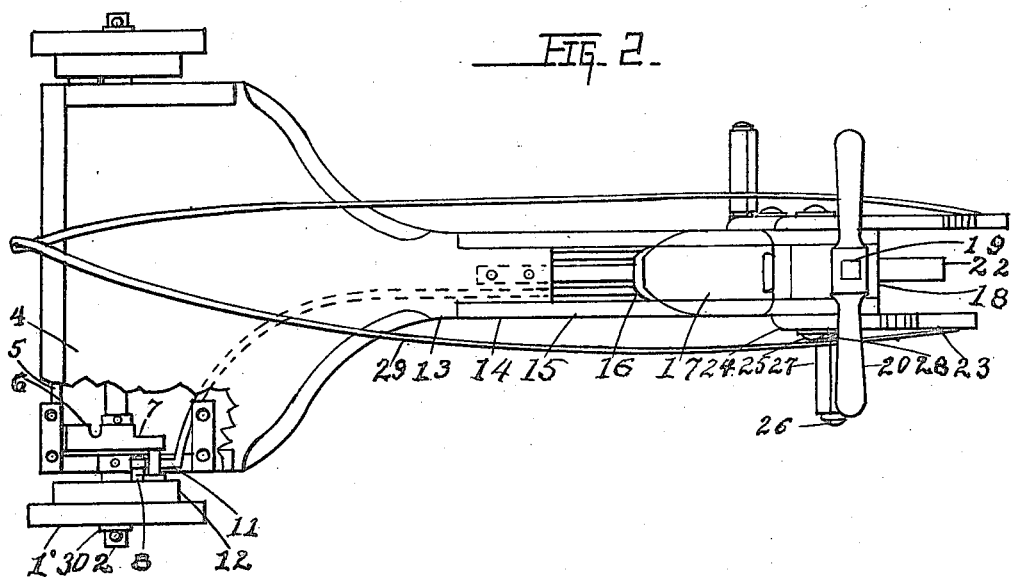

I attain these objects by the mechanism illustrated in the accompanying drawings, in which:

Figure 1 is a side view, one of the drive wheels of the velocipede being removed. Fig. 2 is a top view of the parts seen in Fig. 1, certain portions of the cart seat being broken away. Fig. 3 is an enlarged side view, in detail, of the drive wheel operating mechanisms. Fig. 4 is a vertical section, in detail, of one of the mechanisms shown in Fig. 3, cut longitudinally through the center of the axle. Fig. 5 is an enlarged transverse section, on the line 1—1, seen in Fig. 1, looking toward the right, showing the pivotal connections in detail.

The velocipede comprises the following described parts.

A drive wheel 1', loosely mounted for rotation on each end of the axle 2, a seat support 3 secured on each end portion of said axle, each end of the seat 4 being secured respectively on said supports, and a stop rod 5, the ends of which are respectively secured in said supports, for limiting return movement of the weights 6. Since the driving mechanisms are alike in their construction and operation, but one mechanism is described.

Said weight is formed with the pawl carrier 7, which is oscillatably mounted on the axle 2. The pawl 8 is oscillatably mounted on the free end of said pawl carrier, the upper end portion of which pawl is provided with the preferably leather pawl shoe 9, secured thereon. The lower end of said pawl is crank connected with the rear end of the connecting rod 11, whereby said pawl is oscillated counter-clockwise, for moving the pawl shoe 9 into contact with the inner surface of the flange 12, which is secured on the inner side of the wheel 1', as seen in Fig. 4.

The tongue 13, formed with the seat 4, extends forward and is secured between the hind legs 14 of the horses 15.

Said horses are preferably formed of wood and are respectively secured on the sides of the block 16, of the top portion of which the saddle 17 is formed. The front end portion of said horses are similarly secured on the headpost 18, in which the steering post is oscillatably mounted.

The T handle 20 is secured on the upper end of said steering post. The fork sides 21 are respectively secured on the sides of the lower end portion of said steering post, as seen in Figs. 2 and 5. The steering wheel 22 is rotatably mounted between the lower ends of said fork sides.

Since said horses are alike in their construction and operation, a further detailed description of but one horse is deemed sufficient.

The head 23 and the front leg 24 of said horse are formed integrally, of wood. Said front leg is oscillatably secured on the outer side of the front end portion of the horse 15, by the pivot 25, which passes through the shoulder portion of said leg. The inner end portion of the pedal stem 26 is secured in the lower end portion of said front leg. The pedal 27 is rotatably mounted on the outer end portion of said stem.

The front end of the connecting rod 11 is crank connected with the intermediate portion of said leg, by the pivot 28.

The lines 29 lead from the horses' heads to the seat 4, for permitting a child to grasp them and pretend to thereby be guiding said horses.

Referring to Fig. 4, the hub 30, of the wheel 1' is formed with the flange 12 and forms a metal bearing and hub for said wheel.

In the operation of the described velocipede, with both of the driving mechanisms in the position of the one which is designated in Fig. 1, the operator of the vehicle seats himself in the saddle 17, places his feet on the pedals 27 and his hands on the T handle 20. He thereafter pushes the undesignated pedal forward, which by its previously described rod and crank connections, oscillates counter-clockwise its connected pawl 8, thereby oscillatably moving its shoe 9 into contact with the inner surface of the flange 12 which stops said pawl and its shoe from further oscillation on the pawl carrier 7. Further movement of said pedal and the therewith connected rod 11, move said pawl and the therewith connected pawl carrier with the weight, from the position of the indicated parts seen in Fig. 1, to the position of the undesignated parts. The frictional contact of the shoe 9 with the flange 12, rotates it and the therewith connected wheel 1' clockwise, for propelling the velocipede.

This movement of the parts is stopped by contact of the weight 6 with the stop rod 5, which latter is of small diameter and is elastic to a small extent.

At this juncture, said operator relieves said pedal from the pressure of his foot, upon which the pressure of the pawl shoe 9 is thereby relieved from the flange 12, and the gravity of the weight 6 returns the parts of the driving mechanism from their described position to the position of the designated parts.

Said operator may repeat the propelling operations, with the same foot or with both feet either simultaneously or alternately, thereby propelling the velocipede.

When it is desired to stop the vehicle, the operator after the weight 6 is stopped against the stop rod 5, (as previously described,) maintains the pressure of his foot against the pedal 27, thereby continuing the pressure of the shoe 9 against the flange 12, which acts as a brake and stops the vehicle, or by maintaining a slight pressure upon said pedal, he regulates the pressure of said shoe, for retarding the speed of the velocipede while coasting.

It will be understood that the operation of applying a brake may be performed for one or both of the wheels 1.

It will also be understood, that the operator can propel the velocipede, with a child seated on the seat 4, in which case said child may grasp the lines 29 and pretend to thereby be guiding the previously described horses, which affords interest and pleasure for it.

The rearward oscillation of the leg 24, moves the therewith formed head 23 (see Fig. 1,) from the position shown, to the position of the undesignated head. The return movement of said leg lifts said head from the described position to the position shown. The undesignated head is operated in the same manner, by operation of its respective leg.

These movements of the heads of the horses add to the interest and pleasure of both the operator and the previously mentioned child.

The operator of the velocipede may transport freight on the seat 4, thus adding to the usefulness of the vehicle.

Having fully described my invention, what I claim as new and desire to secure by Letters Patent, is:

In a velocipede; a transporting wheel; a flange secured on the inner side of said wheel; an axle for said vehicle on the end portion of which axle said wheel is rotatably mounted; a pawl carrier oscillatably mounted on said axle adjacent to said wheel; a pawl oscillatably mounted on said pawl carrier; a shoe secured on the upper end portion of said pawl for being brought into contact with the inner surface of said flange; a connecting rod the rear end of which is crank connected with the lower end portion of said pawl; rod moving means whereby said connecting rod is manually moved forward; a weight formed with said pawl carrier by the gravity of which said carrier and the therewith connected parts are moved for their return movement; and stopping means whereby the forward movement of said connecting rod and the therewith connected parts is limited.

In testimony whereof I affix my signature.

JOHN R. SCHWARZ.